(12) United States Patent
Katou

(10) Patent No.: US 6,978,207 B2
(45) Date of Patent: Dec. 20, 2005

(54) NAVIGATION APPARATUS FOR A VEHICLE AND PROGRAM

(75) Inventor: Kiyohide Katou, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 63 days.

(21) Appl. No.: 10/743,034

(22) Filed: Dec. 23, 2003

(65) Prior Publication Data

US 2004/0148096 A1    Jul. 29, 2004

(30) Foreign Application Priority Data

Jan. 24, 2003  (JP) .............................. 2003-016334

(51) Int. Cl.[7] .......................................... G01C 21/34
(52) U.S. Cl. .................. 701/201; 701/211; 340/995.19
(58) Field of Search ............................... 701/209, 210, 701/211, 208, 201; 340/995.19, 995.23

(56) References Cited

U.S. PATENT DOCUMENTS

| | | | | |
|---|---|---|---|---|
| 5,168,452 A | * | 12/1992 | Yamada et al. | 701/202 |
| 5,285,391 A | * | 2/1994 | Smith et al. | 701/200 |
| 5,506,779 A | * | 4/1996 | Kanki | 701/209 |
| 5,519,619 A | * | 5/1996 | Seda | 701/201 |
| 5,646,856 A | * | 7/1997 | Kaesser | 701/207 |
| 5,899,955 A | * | 5/1999 | Yagyu et al. | 701/209 |
| 6,505,118 B2 | * | 1/2003 | Chowanic et al. | 701/209 |
| 6,751,548 B2 | * | 6/2004 | Fox et al. | 701/201 |
| 6,778,905 B2 | * | 8/2004 | Horikami | 701/213 |

FOREIGN PATENT DOCUMENTS

| | | |
|---|---|---|
| JP | A 08-16991 | 1/1996 |
| JP | A 09-292251 | 11/1997 |

* cited by examiner

*Primary Examiner*—Michael J. Zanelli
(74) *Attorney, Agent, or Firm*—Oliff & Berridge, PLC

(57) ABSTRACT

A navigation apparatus for a vehicle that registers a place of departure, a destination, and a route traveled by the vehicle and determines whether an input place of departure and input destination are respectively substantially the same as a place of departure and destination of a registered route. The navigation apparatus reads out a portion of a particular registered route from registered route information, the particular registered route having substantially the same place of departure and destination as the respective input place of departure and input destination, and the portion of the particular registered route being that portion of the particular registered route within a predetermined layer of map data which has been organized into layers. The navigation apparatus performs route guidance based on a the read out route.

20 Claims, 8 Drawing Sheets

UPPER-RANK LAYER

INTERMEDIATE LAYER

LOWER-RANK LAYER

Fig. 3
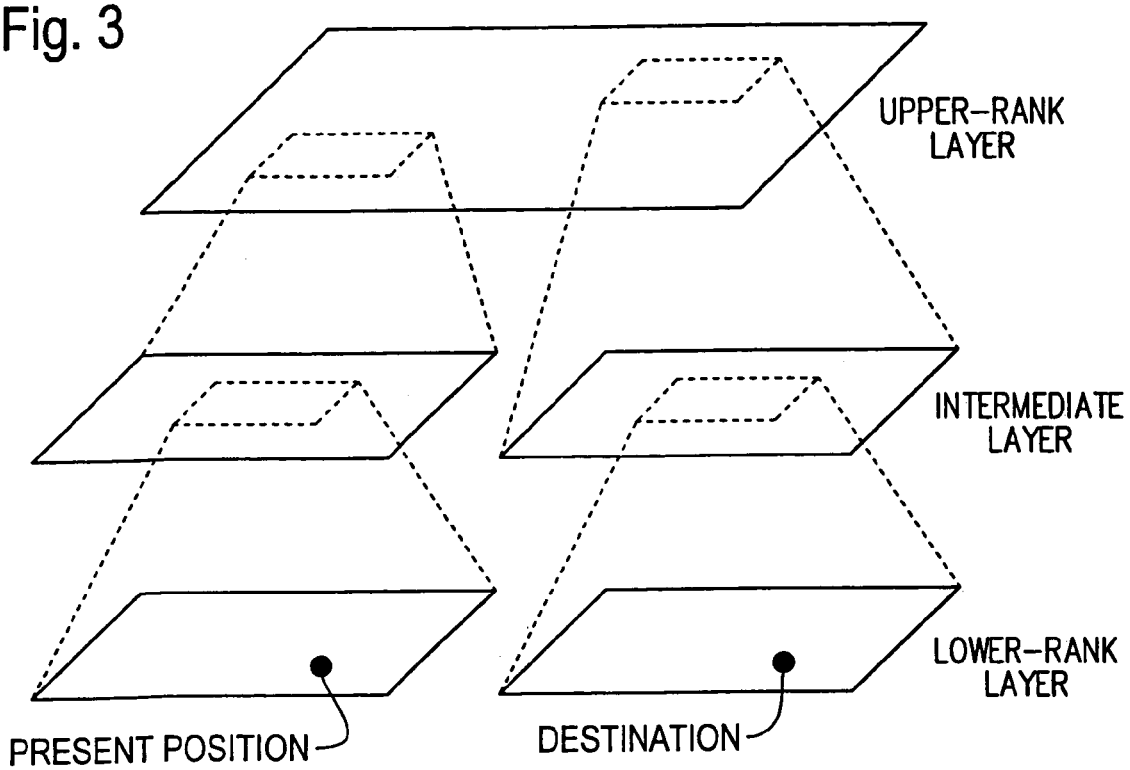
Fig. 4
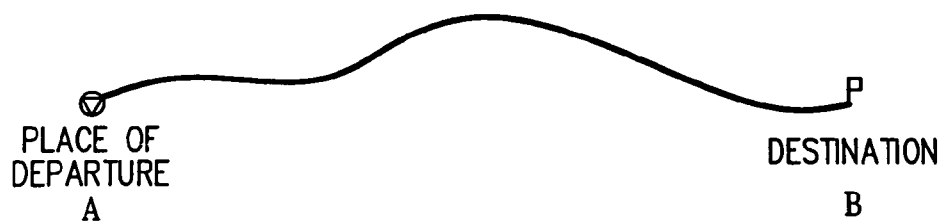
Fig. 5

Fig. 6
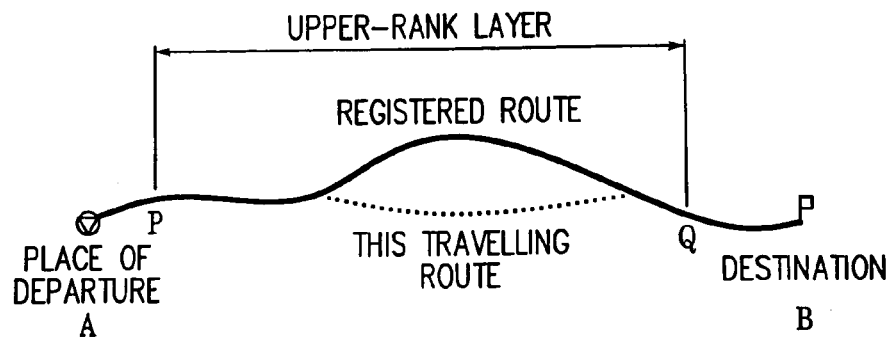
Fig. 7
Fig. 8
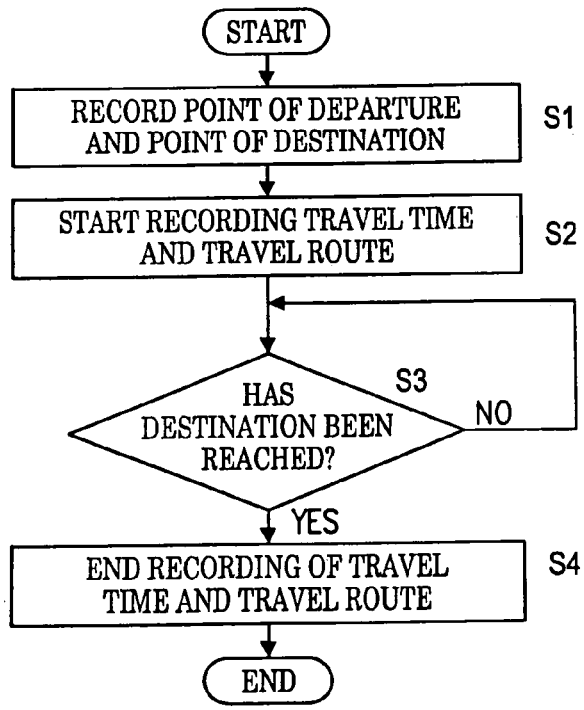

NAVIGATION APPARATUS FOR A VEHICLE AND PROGRAM

INCORPORATION BY REFERENCE

The disclosure of Japanese Patent Application No. 2003-016334 filed Jan. 24, 2003 including the specification, drawings, and claims is incorporated herein by reference in its entirety.

BACKGROUND OF THE INVENTION

1. Field of Invention

The present invention relates to vehicle navigation apparatus and programs that control vehicle navigation apparatus.

2. Description of Related Art

In a conventional navigation apparatus, when a place of departure (or the current position), and a destination are input, search data, such as road data, are read out and a route search is performed based on preset search logic, for example, the shortest traveling distance, or preference for a particular road type. When a user selects one of the routes that are returned by a search, the user is guided by visual signals and/or audio signals along the selected route until the user reaches the destination.

In some cases, however, a route returned by a search based only on search logic and search data as described above may not be a route that the user prefers. Therefore, conventional navigation apparatus accumulate driving data and predict a user's preferences, such as a road or roads that the user prefers, and search for a route accordingly. For example, Japanese Patent Application Laid-Open No. 9-292251 describes a navigation apparatus that stores the number of times that a user has passed certain intersections and searches for a route by giving preference to routes containing intersections that the user frequently passes. Japanese Patent Application Laid-Open No. 8-16991 describes another navigation apparatus that registers traveling circumstances such as a width of road, a kind of road, or traveling speed and predicts a user's preferences based on the registered traveling circumstances.

SUMMARY OF THE INVENTION

However, in the above-described navigation apparatus, because the navigation apparatus considers a user's preferences, such as a user's favorite roads and gives preference to routes that match the user's preference, the navigation apparatus may return an indirect route. Consequently, in these circumstances the above-described navigation apparatus are incapable of returning a direct route.

Accordingly, the present invention provides a navigation apparatus for a vehicle including a registration means for registering a place of departure, a destination, and a route traveled by the vehicle; a determination means for determining whether an input place of departure and input destination are respectively substantially the same as a place of departure and destination of a registered route; a route search means for reading out a portion of a particular registered route from registered route information, the particular registered route having substantially the same place of departure and destination as the respective input place of departure and input destination, and the portion of the particular registered route being that portion of the particular registered route within a predetermined layer of map data which has been organized into layers; and a control means for performing route guidance based on a route returned by the search means.

The present invention separately provides a method for providing guidance based on registered route information, including inputting a place of departure; inputting a destination; comparing the input place of departure and input destination to respective places of departure and destinations of registered routes; determining if the input place of departure and input destination are substantially the same as a respective place of departure and destination of a registered route; reading out, if the input place of departure and input destination are substantially the same as a respective place of departure and destination of a particular registered route, a portion of that particular registered route that is within a predetermined layer of map data which has been organized into layers; and providing guidance.

Finally, according to the present invention, there is provided A storage medium storing a set of program instructions executable on a data processing device and usable for providing guidance on a navigation apparatus, the set of program instructions including instructions for inputting a place of departure; instructions for inputting a destination; instructions for comparing the input place of departure and input destination to respective places of departure and destinations of registered routes; instructions for determining if the input place of departure and input destination are substantially the same as a respective place of departure and destination of a registered route; instructions for reading out, if the input place of departure and input destination are substantially the same as a respective place of departure and destination of a particular registered route, a portion of that particular registered route that is within a predetermined layer of map data which has been organized into layers; and instructions for providing guidance.

BRIEF DESCRIPTION OF THE DRAWINGS

Exemplary embodiments of the invention will now be described with reference to the accompanying drawings, wherein:

FIG. 3 is a diagram for explaining a route search using map data having a hierarchical, or layered, structure;

FIGS. 4–5 are explanatory view sin the case of registering the first route that the vehicle traveled;

FIGS. 6–7 are diagrams for explaining route guidance when the same place of departure and destination as a registered route are set up;

FIG. 8 is a diagram for explaining a processing flow for registering a traveling route;

DETAILED DESCRIPTION OF EXEMPLARY EMBODIMENTS

Figure 1:
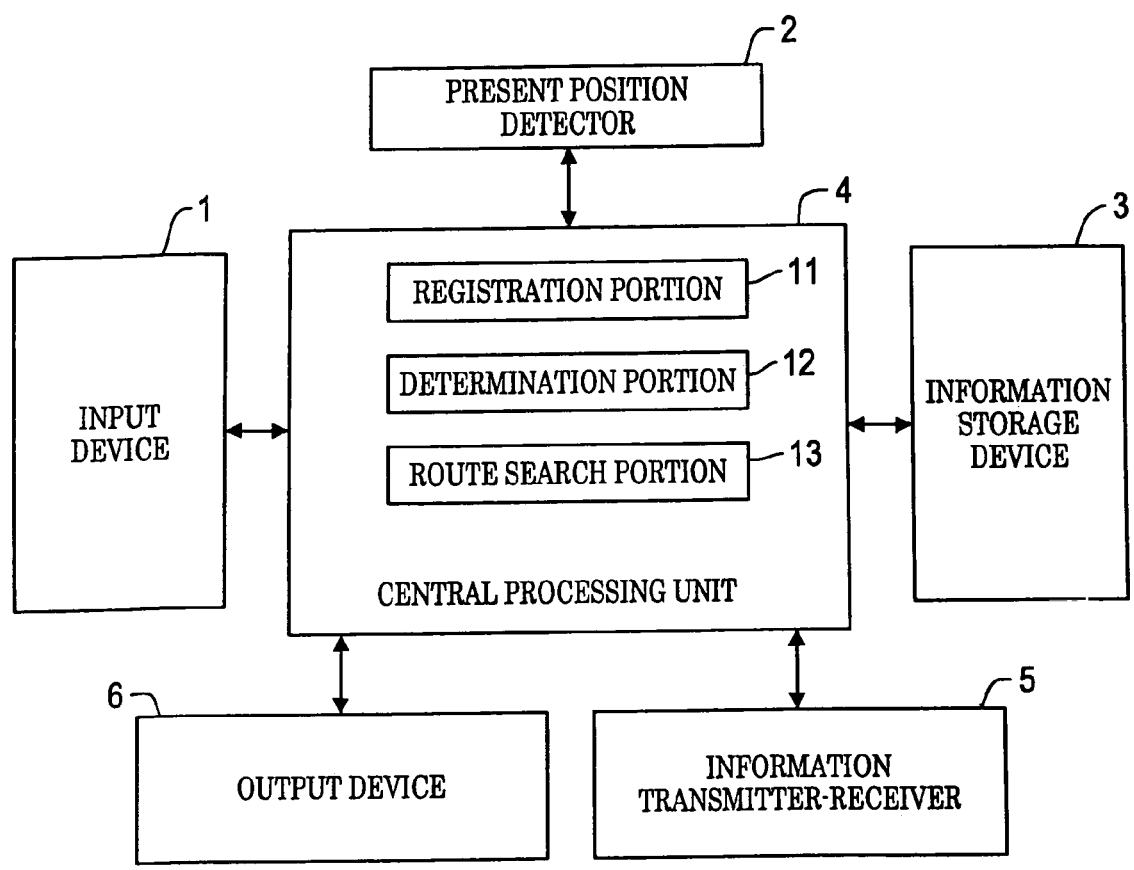
FIG. 1 is a diagram for indicating an example of a navigation apparatus associated with an embodiment of the present invention.

FIG. 1 shows one example of a navigation apparatus that may be used with this exemplary embodiment of the present invention. It includes an input device 1 for inputting information related to a route guidance, such as a place of departure and a destination; a present position detector 2 for detecting information related to a present position of a vehicle for use as, for example, a place of departure, or tracking a vehicle's location; an information storage device 3 in which map data, navigation data necessary for route search, visual/audio guidance data necessary for a route guidance, and programs (applications and/or operating systems) for performing map display, route search and guidance such as audio guidance are recorded; a central processor 4 for navigation processing, (for example, map display processing, route search processing, and display/audio guidance processing necessary for route guidance,) and for controlling the entire system; an information transmitter-receiver 5 for transmitting and receiving, for example, road information and traffic information, and information related to the present position of the vehicle; and an output device 6 such as a display and/or speaker for outputting information related to route guidance.

The central processor 4 of the embodiment has a registration portion 11 substantially dedicated to associating and registering the place of departure, the destination and the traveled route (storing them in a non-volatile memory and the like in an information storage device and a central processor) and a function of updating the route. The central processor 4 further includes a determination portion 12 substantially dedicated to determining whether an input place of departure and an input destination are substantially the same as the place of departure and the destination of a registered route, a route search portion 13 substantially dedicated to reading out road information of a predetermined layer hierarchized in accordance with a degree of details of roads comprising registered routes, and searching for the route by reducing search costs for a registered route when it is determined that the input place of departure and input destination are substantially the same as the place of departure and the destination of that registered route. In various exemplary embodiments of the systems and methods according to this invention, the predetermined layer, which is used for the route search, varies according to the distance between the input place of departure and the input destination necessary for guidance. For example, when the distance between the input place of departure and the input destination is long, an upper-rank layer is used, and when distance between the input place of departure and the input destination is short, a lower-rank layer is used. It should be appreciated that whether the place of departure and the destination of the previously registered route are the same as a respective input place of departure and destination may be determined by a range. Distance for the determination may be set to, for example 100 m. Furthermore, the range value may vary in accordance with the distance between the place of departure and the destination. It should also be appreciated that according to various exemplary embodiments of the systems and methods according to the invention the input place of departure may be detected by the present position detector 2, rather than input by a user.

In various embodiments, the portion of the registered route within the predetermined layer is provided as a recommended route without performing a search. For example, when a distance between the place of departure and the destination is over 100 km, wide-range map data needs to be searched for the route search. However, by utilizing an upper-rank layer portion of a registered route from among the various roads of a registered route, the actual search range is limited to a route connecting the input place of departure to the upper-rank layer portion of the registered route and a route connecting the input destination with the upper-rank layer portion of the registered route. Therefore, the time required for processing the route search is reduced to a large degree.

Furthermore, when the portion of the registered route within the predetermined layer is utilized as the recommended route without performing a search within that predetermined layer, for example, a route which is impracticable may be changed when, based on traffic regulation data, the navigation device determines that one or more portions of the route are impassible. In this case the navigation device only searches for a route within the predetermining layer around the impassible portion. Thereby, search time is reduced.

Figure 2:
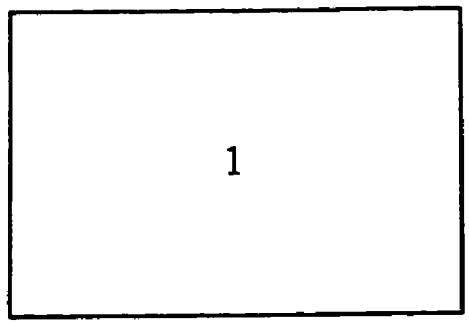
FIG. 2 is a diagram for explaining a structure of hierarchized map data.
Figure 2:
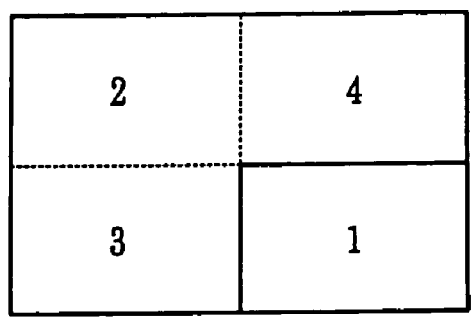
Figure 2:
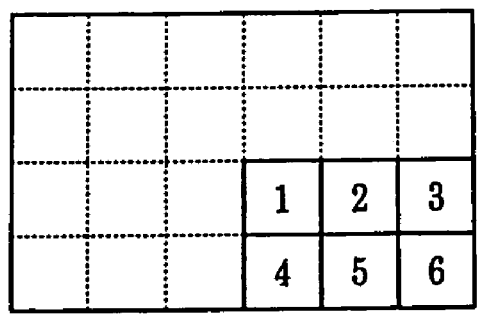

FIG. 2 is a diagram for explaining the structure of map data hierarchized in accordance with a degree of details of roads. Map data may be organized in a hierarchical, or layered, structure. For example, it may be divided into a lower-rank layer, an intermediate layer, and an upper-rank layer in accordance with a degree of details of the roads. For example, the lower-rank layer is detailed map data including ordinary roads, the intermediate layer is map data including municipal and state roads, and the upper-rank layer is map data including highway and toll roads, and nation roads. The higher the layer becomes, the rougher, or more general, the map data becomes, because not as much information, or map data, regarding lower-ranked ordinary roads is provided. A block number indicating an area to which the road in question belongs is affixed to each layer. The block numbers in the various layers are stored in the information storage device 3 in association with one another. For example, as shown in FIG. 2 block number 1 in the upper-rank layer includes block numbers 1 to 4 of the intermediate layer, and block number 1 in intermediate layer includes block number 1 to 6 of the lower-rank layer.

FIG. 3 is a diagram for explaining a route search with map data having the hierarchical, or layered, structure. For example, in the case that the positional coordinates of the present position lie in the area of block number 1 of lower-rank layer and the positional coordinates of the destination lie in the area of block number 6 of lower-rank layer 1, when the route search is performed only within the lower-rank layer, the search range must be expanded to a higher layer because of the difference of the block number (i.e., blocks 1 and 6 are not adjacent to one another). However, if data for block number 1 of the intermediate layer is read out, all map data between the present position and the destination is read out and the route search is performed based on read-out data. Likewise, in the case that the positional coordinates of the present position lie in the area of block number 1 of the intermediate layer and the positional coordinates of the destination lie in the area of block number 2 of the intermediate layer, when the route search is performed with only data of the intermediate layer, the search range still must be expanded to a higher layer. However, if the area of block number 1 of the upper-rank layer is read out, all map data between the present position and the destination has been read out and the route search is performed based on the read-out data. Thus, the search including the road of lower-rank layer is performed at the vicinity of the place of departure and the destination, and the route search is performed by roads of intermediate layer or upper-rank layer between the vicinity of the place of departure and the vicinity of the destination.

One embodiment of associating and registering the place of departure, the destination and the traveled route will now be described with reference to FIGS. 4–7. FIGS. 4 and 5 show exemplary views of registration of the first traveled route. FIG. 4 is a diagram for indicating a guidance route from the place of departure to the destination and FIG. 5 is a diagram for indicating a route registration display on arrival at the destination.

When the vehicle travels a route (shown in FIG. 4), for example, that is often used by the user such as a commuter route connecting a place of departure A (home) and a destination B (workplace), the distance between the place of departure A and the destination B and the time required for the travel are recorded. For example, when the vehicle starts traveling, the recording of the traveling time is started, and when the vehicle approaches a point within a predetermined distance from the destination, it is determined that the vehicle has arrived at the destination and the recording of the traveling time is ended. As a method for determining that the vehicle has arrived at the destination, a condition such as reduction in speed of the vehicle near the destination may be added to the above-described predetermined distance. Thus, the determination whether or not the vehicle has arrived at the destination can be determined more accurately. When the vehicle has arrived at the destination, the guidance display shifts to a registration display as shown in FIG. 5. In this display, the place of departure, the destination, the traveling distance, the traveling time are displayed. Furthermore, a message "Register this route?" and selection request "Yes" and "No" are displayed. If "Yes" is selected, the place of departure, the destination and the route that the vehicle traveled are associated with and registered by a registration means 11. If "No" is selected, the place of departure, the destination and the route that the vehicle traveled are not registered. When the first route is registered, the traveling time and the traveling distance on that route are also registered.

FIGS. 6–7 show diagrams for explaining route guidance when the same place of departure and destination as a registered route are set. FIG. 6 is a diagram for showing a guidance route from the place of departure to the destination. FIG. 7 is a diagram for showing a route registration display when the vehicle has arrived at the destination.

When the same place of departure A and destination B as a respective place of departure and destination of a registered route are input, road information for the portion of that registered within the predetermined layer (upper-rank layer in this embodiment) is read out and a search is performed by reducing the search cost for the read-out portion of the registered route. The road between P and Q of FIG. 6 represents the portion of the registered route within the upper-rank layer and these roads are preferentially searched due to the reduced search cost. The routes between A and P, and between Q and B, routes are searched by ordinary search logic.

For example, when a distance between the input place of departure A and input destination B is long, such as 100 km, expressways or national roads are frequently used for the portion of the route between the vicinity of the input point of departure and the vicinity of the input destination. In that case, if all registered routes are given preference due to reduced search cost in every layer, some portions of the registered routes such as a portion from the place of departure to expressways or nation roads, or from expressways or nation roads to the destination (i.e., lower-rank layer and/or intermediate layer registered routes) may be inconvenient. Therefore, in order to avoid this inconvenience various exemplary embodiments of the systems and methods according to this invention, only give preference to upper-rank layer portions of registered routes for the portion of the route between the vicinity of the input point of departure and the vicinity of the input destination. Consequently, the registered route is utilized for the portion of the route between the vicinity of the input point of departure and the vicinity of the input destination, and the optimal route for the portion of the route between the vicinity of the input point of departure and the vicinity of the input destination is obtained without consideration of the registered routes for the portion of the route between the vicinity of the input point of departure and the vicinity of the input destination. It should be appreciated that for the purpose of the various exemplary embodiments of the systems and methods according to this invention, the "vicinity" is that portion of a route that is within a layer or layers of the map data that are lower, or more detailed, than the predetermined layer.

Similarly, when a distance between the input place of departure and the input destination is about 10 km, the intermediate layer including prefectural roads and the like of registered routes is often used for the portion of the route between the vicinity of the input point of departure and the vicinity of the input destination. When a distance between the input place of departure and input destination is not so long (such as about 1 km), the lower-rank layer including ordinary roads and the like is often used for the portion of the route between the vicinity of the input point of departure and the vicinity of the input destination. Therefore, it is desirable, based on the distance between an input departure point and an input destination, to change the predetermined layer for which registered routes are given preference due to reduced search cost.

When a route that partially includes a portion of a registered route for the predetermined layer is returned by a search, guidance is performed (route indicated by a solid line of FIG. 6), and the vehicle deviates from the registered route, a new search is performed. As such, the vehicle travels a route indicated by a dotted line of FIG. 6. When the vehicle arrives at the destination, the place of departure, the destination, a travel distance, and travel time of the originally returned route with a shortest recorded travel time for that originally returned route, a travel distance and travel time of the traveled route, and selection request to register the traveled route, are displayed as shown on guidance display of FIG. 7. By displaying the recorded shortest travel time for the originally returned route together a travel time of the traveled route, a criterion for determining whether to update the registered route with the traveled route is provided to the user. When the vehicle deviates from the registered route, as described above, a new search is performed and a route that leads back to the original route is provided. Because the new search is performed so as to lead the vehicle back to the original route as much as possible, the user can use the registered route even if he or she inadvertently deviates from the route.

FIG. 8 is a diagram for explaining a processing flow for recording a route according to one embodiment of the methods according to the invention. As shown in FIG. 8, first, input points of departure and destination are recorded, and recording of the travel time and recording of the travel route are started (steps S1 and S2). Then it is determined whether or not the vehicle has reached the destination (step S3). When the vehicle has reached the destination, recording of the travel time and the recording of the travel route end (step S4). As a result, the travel time and the traveled route (including the traveling distance) from the place of departure to the destination are recorded.

Figure 9:
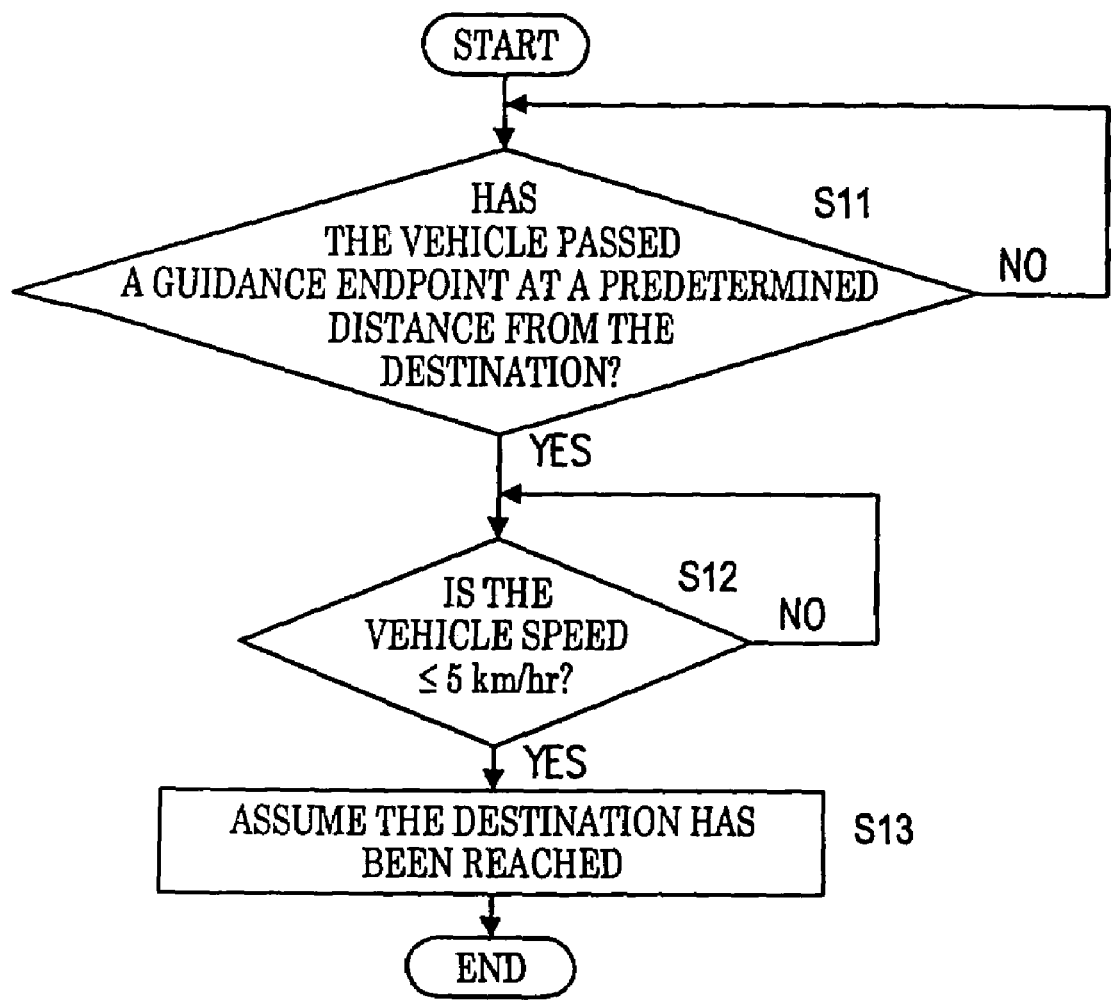
FIG. 9 is a diagram for explaining a processing flow determining whether a vehicle arrived at a destination.

FIG. 9 is a diagram for indicating a processing flow for determining whether the vehicle arrived at the destination. As shown in FIG. 9 first, it is determined whether the vehicle has passed a guidance end point that is at a predetermined distance from the destination (step S11). Once the vehicle passes the guidance end point, it is determined whether or not the speed of the vehicle is less than or equal to 5 km/h (step S12). If the speed of the vehicle is less than or equal to 5 km/h, it is assumed that the vehicle has arrived at the destination (step S13).

Figure 10:
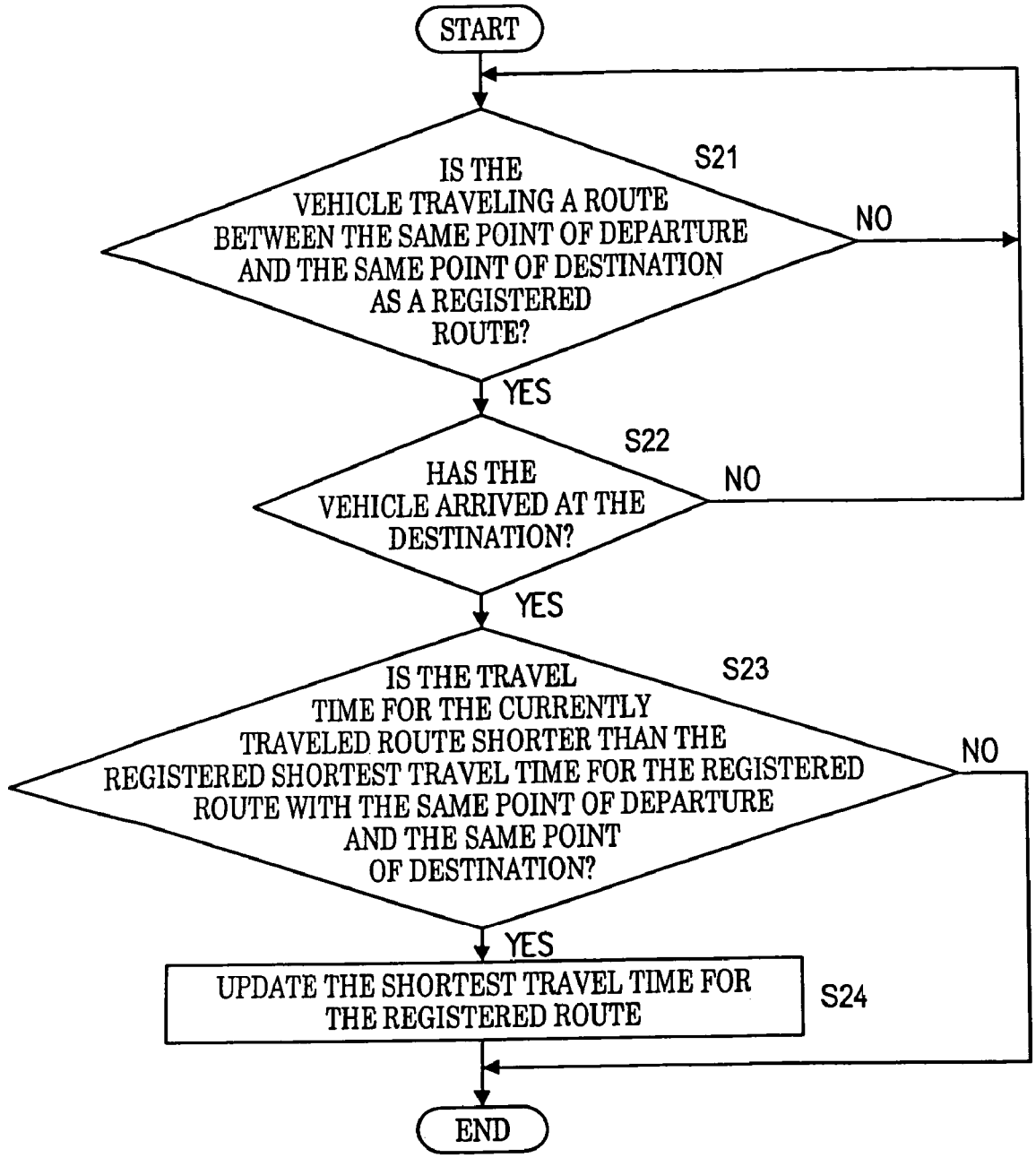
FIG. 10 is a diagram for explaining a processing flow for updating the shortest travel time.

FIG. 10 is a diagram for explaining a processing flow for updating of the shortest travel time for a registered route. As shown in FIG. 10, when the vehicle travels a route between the same point of departure and the same point of destination as a registered route (step S21), and arrives at the destination (step S22), it is determined whether or not the travel time is shorter than the currently registered shortest time for the registered route (step S23). If it is shorter, the travel time that is registered is replaced with the shorter travel time (step S24).

Figure 11:
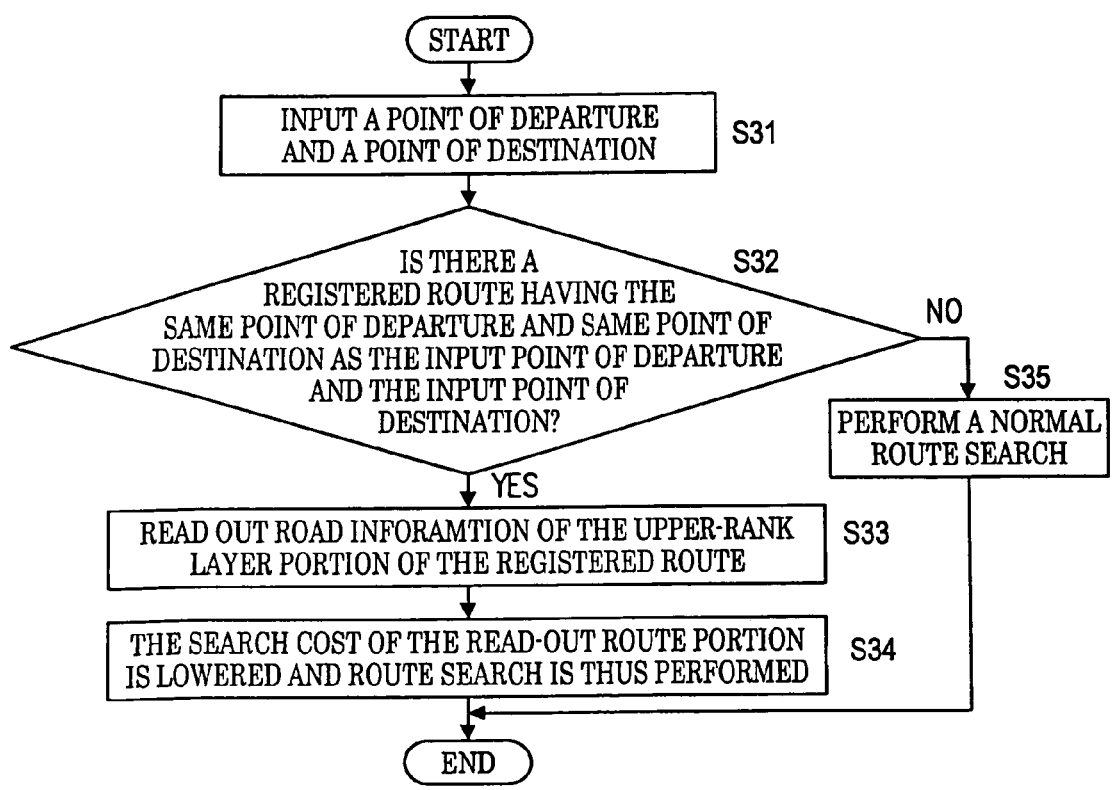
FIG. 11 is a diagram for explaining a search processing flow.

FIG. 11 is a diagram for explaining a processing flow for searching a route. As shown in FIG. 11, when the point of departure and the point of destination are input (step S31), it is determined whether or not there is a registered route for the same point of departure and the same point of destination as the input point of departure and the input point of destination (step S32). When there is such a registered route, road information for the upper-rank layer portion of the registered route is read out (step S33). The search cost of the read out portion is lowered and a route search for the portions other than the read out route is performed with normal search logic (step S34). When there is no registered route at step S32, a normal route search is performed (step S35).

Figure 12:
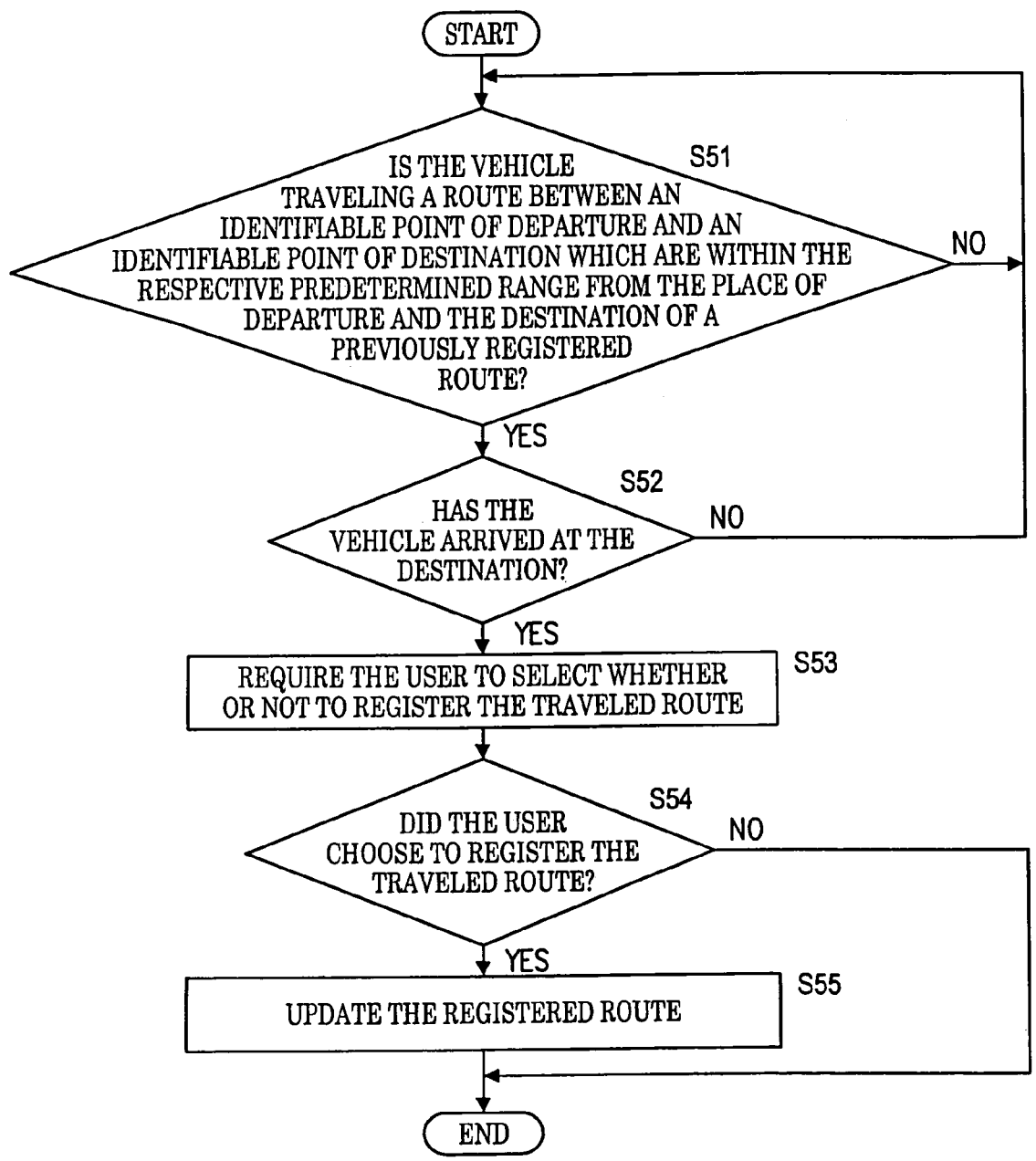
FIG. 12 is a diagram for explaining a processing flow for updating a registered route.

FIG. 12 is a diagram for explaining a processing flow for updating a registered route. As shown in FIG. 12, when the vehicle travels the route between the same place of departure and destination as the respective place of departure and the destination of the registered route (step S41) and arrives at the destination (step S42), the user is required to select whether or not to register the traveled route (step S53). If the user selects to register the traveled route, the registered route is updated (i.e. the selected route replaces the previously designated route having the same departure point and the same destination point) (step S54).

While this invention has been described in conjunction with exemplary embodiments, these embodiments should be viewed as illustrative, not limiting. Various modifications, substitutes, or the like are possible within the spirit and scope of the invention.

What is claimed is:

1. A navigation apparatus for a vehicle comprising:
   a registration means for registering a place of departure, a destination, and a route traveled by the vehicle;
   a determination means for determining whether an input place of departure and input destination are respectively substantially the same as a place of departure and destination of a registered route;
   a route search means for reading out a portion of a particular registered route from registered route information, the particular registered route having substantially the same place of departure and destination as the respective input place of departure and input destination, and the portion of the particular registered route being that portion of the particular registered route within a predetermined layer of map data which has been organized into layers; and
   a control means for performing route guidance based on a route returned by the search means.

2. The navigation apparatus of claim 1, wherein the route search means is also for:
   reducing a search cost for the read out portion of the particular registered route;
   searching for a route between the input place of departure and input destination with a smallest search cost; and
   returning the searched for route with the smallest search cost.

3. The navigation apparatus of claim 1, wherein the route search means is also for:
   searching for a first route connecting the input place of departure with the read out portion of the particular registered route; and
   searching for a second route connecting the input destination with the read out portion of the particular registered route.

4. The navigation apparatus of claim 3, wherein the route search means is also for returning a route comprising the read out portion of the particular registered route, the searched for first route connecting the input place of departure with the read out portion of the particular registered route, and the searched for second route connecting the input destination with the read out portion of the particular registered route.

5. The navigation apparatus of claim 3, wherein if it is determined that it is impossible to travel a section of the read out portion of the particular registered route, the route search means is also for:
   searching for a route around the impossible section of the read out portion of the particular registered route; and
   returning a route comprising all sections of the read out portion of the particular registered route that are possible to travel, the searched for route around the one or more impossible sections of the read out portion of the particular registered route, the first searched for route connecting the input place of departure with the read out portion of the particular registered route, and the second searched for route connecting the input destination with the read out portion of the particular registered route.

6. The navigation apparatus of claim 1, wherein both of the input destination and input place of departure are defined by a user.

7. The navigation apparatus of claim 1, further comprising a present position detector, wherein the input destination is defined by a user and the input place of departure is automatically defined as a current position of the vehicle as determined by the present position detector of the navigation apparatus.

8. The navigation apparatus of claim 1, wherein the registration means is also for recording a travel time for a route traveled.

9. The navigation apparatus of claim 8, wherein the registration means is also for updating the travel time for a route traveled.

10. The navigation apparatus of claim 9, wherein the registration means updates a travel time for a registered route when:
    a traveled route has substantially the same place of departure and destination as a respective place of departure and destination of a registered route; and the travel time of the traveled route is less than the travel time of the registered route.

11. The navigation apparatus of claim 10, wherein the registration means only updates the travel time for a registered route when a user input is received requesting that the travel time for the registered route to be updated is received.

12. The navigation apparatus of claim 1, wherein the map data is organized into at least the following layers:
an upper-rank layer comprising interstates and highways;
an intermediate layer comprising the upper-rank roads and state and municipal roads; and
a lower-rank layer comprising all roads.

13. A method for providing guidance based on registered route information, comprising:
inputting a place of departure;
inputting a destination;
comparing the input place of departure and input destination to respective places of departure and destinations of registered routes;
determining if the input place of departure and input destination are substantially the same as a respective place of departure and destination of a registered route;
reading out, if the input place of departure and input destination are substantially the same as a respective place of departure and destination of a particular registered route, a portion of that particular registered route that is within a predetermined layer of map data which has been organized into layers; and
providing guidance.

14. The method of claim 13, further comprising:
reducing a search cost for the read out portion of the particular registered route;
searching for a route between the input place of departure and input destination with a smallest search cost; and
returning the searched for route with the smallest search cost;
wherein providing guidance comprises providing guidance based on the route with the smallest search cost.

15. The method of claim 13, further comprising:
searching for a first route connecting the input place of departure with the read out portion of the particular registered route; and
searching for a second route connecting the input destination with the read out portion of the particular registered route.

16. The method of claim 15, wherein providing guidance comprises returning a route comprising the read out portion of the particular registered route, the first searched for route connecting the input place of departure with the read out portion of the particular registered route, and the second searched for route connecting the input destination with the read out portion of the particular registered route.

17. The method of claim 15, further comprising:
determining whether it is possible to travel all sections of the read out portion of the particular registered route; and
searching, if it is impossible to travel one or more sections of the read out portion of the particular registered route, for a route around the one or more impossible sections of the read out portion of the particular registered route;
wherein providing guidance comprises returning a route comprising all sections of the read out portion of the particular registered route that are possible to travel, the searched for route around the one or more impossible sections of the read out portion of the particular registered route, the first searched for route connecting the input place of departure with the read out portion of the particular registered route, and the second searched for route connecting the input destination with the read out portion of the particular registered route.

18. A storage medium storing a set of program instructions executable on a data processing device and usable for providing guidance on a navigation apparatus, the set of program instructions comprising:
instructions for inputting a place of departure;
instructions for inputting a destination;
instructions for comparing the input place of departure and input destination to respective places of departure and destinations of registered routes;
instructions for determining if the input place of departure and input destination are substantially the same as a respective place of departure and destination of a registered route;
instructions for reading out, if the input place of departure and input destination are substantially the same as a respective place of departure and destination of a particular registered route, a portion of that particular registered route that is within a predetermined layer of map data which has been organized into layers; and
instructions for providing guidance.

19. The storage medium of claim 18, further comprising:
instructions for reducing a search cost for the read out portion of the particular registered route;
instructions for searching for a route between the input place of departure and input destination with a smallest search cost; and
instructions for returning the route with the smallest search cost;
wherein the instructions for providing guidance comprise instructions for providing guidance based on the route with the smallest search cost.

20. The storage medium of claim 18, further comprising:
instructions for searching for a first route connecting the input place of departure with the read out portion of the particular registered route; and
instructions for searching for a second route connecting the input destination with the read out portion of the particular registered route; and
wherein the instructions for providing guidance comprise instructions for returning a route comprising the read out portion of the particular registered route, the first searched for route connecting the input place of departure with the read out portion of the particular registered route, and the second searched for route connecting the input destination with the read out portion of the particular registered route.

* * * * *